(12) United States Patent
Yamazoe et al.

(10) Patent No.: US 11,267,342 B2
(45) Date of Patent: Mar. 8, 2022

(54) BATTERY CONTROL SYSTEM (71) Applicant: Vehicle Energy Japan Inc., Hitachinaka (JP)

(72) Inventors: Takanori Yamazoe, Tokyo (JP); Kei Sakabe, Tokyo (JP)

(73) Assignee: Vehicle Energy Japan Inc., Hitachinaka (JP)

( * ) Notice: Subject to any disclaimer, the term of this patent is extended or adjusted under 35 U.S.C. 154(b) by 175 days.

(21) Appl. No.: 16/484,660

(22) PCT Filed: Feb. 13, 2018

(86) PCT No.: PCT/JP2018/004762
§ 371 (c)(1),
(2) Date: Aug. 8, 2019

(87) PCT Pub. No.: WO2018/155246
PCT Pub. Date: Aug. 30, 2018

(65) Prior Publication Data
US 2020/0014231 A1 Jan. 9, 2020

(30) Foreign Application Priority Data

Feb. 24, 2017 (JP) .............................. JP2017-033310

(51) Int. Cl.
*H02J 7/00* (2006.01)
*B60L 3/00* (2019.01)
(Continued)

(52) U.S. Cl.
CPC .............. *B60L 3/00* (2013.01); *H02J 7/0068* (2013.01); *H04B 1/0475* (2013.01); *H04L 27/04* (2013.01);
(Continued)

(58) Field of Classification Search
CPC .......... H02J 7/0021; H02J 7/02; H02J 7/0068; H04B 1/0475; H04L 27/04
(Continued)

(56) References Cited

U.S. PATENT DOCUMENTS

2005/0264408 A1    12/2005  Iijima
2010/0013428 A1*    1/2010  Shin .......................... H02J 7/35
                                                        320/101
(Continued)

FOREIGN PATENT DOCUMENTS

JP       10-224259 A    8/1998
JP       2005-135762 A  5/2005
(Continued)

OTHER PUBLICATIONS

International Search Report (PCT/ISA/210) issued in PCT Application No. PCT/JP2018/004762 dated May 15, 2018 with English translation (five pages).

(Continued)

*Primary Examiner* — Emmanuel Bayard
(74) *Attorney, Agent, or Firm* — Crowell & Moring LLP (57) ABSTRACT

The purpose of the present invention is to provide a battery control system which enables extending the communication range between a cell controller and a battery controller while keeping power consumption in the cell controller low and which is capable of ensuring communication reliability. In this battery control system, after transmitting a response request to the cell controller, the battery controller transmits to the cell controller a non-modulated wave having a power level lower than that of the response request, and the cell controller generates a response signal by performing amplitude-modulation on the non-modulated wave (see FIG. 6).

10 Claims, 8 Drawing Sheets

(51) Int. Cl.
*H04B 1/04* (2006.01)
*H04L 27/04* (2006.01)
*B60K 6/28* (2007.10)

(52) U.S. Cl.
CPC ............. *B60K 6/28* (2013.01); *B60Y 2200/91* (2013.01); *B60Y 2200/92* (2013.01); *H04B 2001/0408* (2013.01)

(58) Field of Classification Search
USPC .................................. 375/303, 308, 316, 295
See application file for complete search history.

(56) References Cited

U.S. PATENT DOCUMENTS

| | | | | |
|---|---|---|---|---|
| 2014/0028244 | A1* | 1/2014 | Korekoda | H02J 50/40 320/106 |
| 2014/0354291 | A1* | 12/2014 | Kikuchi | G01R 31/382 324/434 |
| 2015/0028816 | A1* | 1/2015 | Lee | H02J 7/0021 320/134 |
| 2016/0006343 | A1* | 1/2016 | Terada | H02J 50/10 307/104 |
| 2016/0137091 | A1 | 5/2016 | Yamazoe et al. | |
| 2016/0301112 | A1 | 10/2016 | Yamazoe et al. | |
| 2016/0344792 | A1* | 11/2016 | Sinivaara | H04N 21/43637 |
| 2017/0149101 | A1* | 5/2017 | Sakabe | H01M 10/48 |
| 2017/0309972 | A1* | 10/2017 | Peng | G01R 31/371 |
| 2019/0148952 | A1* | 5/2019 | Remboski | H02J 7/00302 320/128 |
| 2019/0242949 | A1* | 8/2019 | Lemkin | H01M 10/482 |

FOREIGN PATENT DOCUMENTS

| | | |
|---|---|---|
| JP | 2006-8085 A | 1/2006 |
| JP | 2014-197345 A | 10/2014 |
| JP | 2016-96623 A | 5/2016 |

OTHER PUBLICATIONS

Japanese-language Written Opinion (PCT/ISA/237) issued in PCT Application No. PCT/JP2018/004762 dated May 15, 2018 (five pages).

* cited by examiner

BATTERY CONTROL SYSTEM

TECHNICAL FIELD

The present invention relates to a technique for controlling batteries.

BACKGROUND ART

Global environment problem has been drawing attention significantly now, and thus it is required to reduce emission of carbon dioxide gas in various scenes for the sake of preventing global warming. Regarding gasoline engine vehicles which emit significant amount of carbon dioxide gases, replacement into hybrid electric vehicles or electric vehicles is ongoing.

Large secondary batteries, such as typified by electric power source of hybrid electric vehicles or electric vehicles, are required to have high output and large capacity. Thus rechargeable battery module that forms large secondary battery is constructed by connecting a plurality of batteries (hereinafter, referred to as cell or cells) in series or in parallel. In addition, lithium ion battery functioning as secondary battery is required to appropriately prevent high-voltage charging or deterioration due to excessive discharge. Therefore, rechargeable battery modules equipped in hybrid electric vehicle or in electric vehicle have functionalities for detecting battery states such as voltage, current, or temperature.

Battery control system typically includes a cell controller (CC) and a battery controller (BC). One CC measures battery states of one or more cells. BC acquires battery states of cells from each of CCs, and calculates State of Charge (SOC) or State of Health (SOH) according to the acquired battery states. BC notifies the calculated result to upper controllers or the like.

Patent Literature 1 listed below discloses a configuration of battery control system. Patent Literature 1 connects between CC and BC via wireless communication, thereby attempting to reduce wiring cost, insulating cost for high voltage measures, or assembling cost.

CITATION LIST

Patent Literature

Patent Literature 1: JP Patent Publication 2005-135762 A

SUMMARY OF INVENTION

Technical Problem

In the technique described in Patent Literature 1, it is assumed that the cell controller wirelessly communicates with the battery controller using a wireless tag. The wireless tag has relatively short communication range (e.g. approximately several cm). Thus when establishing a wireless communication between the battery controller and the cell controller using the wireless tag, the distance between those controllers will be short. Then a possibility will be increased where communication error occurs due to such as interferences.

It may be conceived that the cell controller is configured as an active-type wireless terminal, thereby increasing the communication range between the battery controller and the cell controller. In this case, however, the power consumption of the cell controller will be increased. When configuring the cell controller as a passive-type terminal as well as increasing the communication range, it may be conceived that the signal level sent from the battery controller is sufficiently increased. In this case, however, the send signal sneaks into the receiving side, which may reduce the receive sensitivity.

The present invention has been made in view of the problems above, and an objective of the present invention is to provide a battery control system that is capable of restricting power consumption of the cell controller whereas increasing the communication range between the cell controller and the battery controller, and of keeping communication reliability.

Solution to Problem

In a battery control system according to the present invention: a battery controller sends a response request to a cell controller, and then sends a non-modulated wave with a power level smaller than that of the response request to the cell controller; the cell controller generates a response signal by performing amplitude modulation to the non-modulated wave.

Advantageous Effects of Invention

According to the battery control system of the present invention, the cell controller does not have to generate carrier waves for sending response signals, and thus it is possible to suppress power consumption. In addition, the battery controller sends the non-modulated wave with signal level reduced than that of the response request, and thus it is possible to keep the communication range of the response request whereas suppressing influence of sneak signal.

DESCRIPTION OF EMBODIMENTS

Embodiment 1

Figure 1:
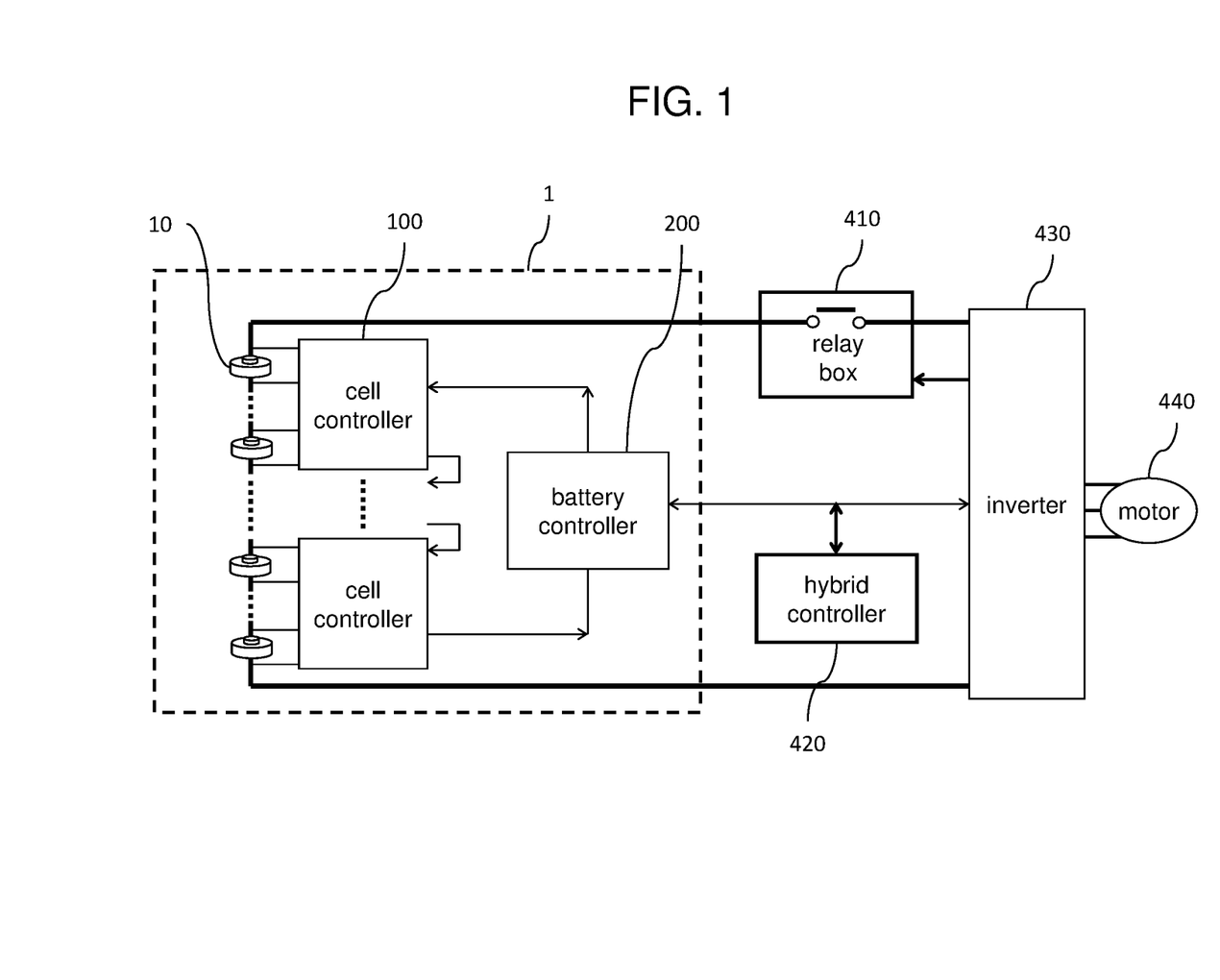
FIG. 1 is a configuration diagram of a battery control system 1 according to an embodiment 1.

FIG. 1 is a configuration diagram of a battery control system 1 according to an embodiment 1 of the present invention. The battery control system 1 is a system that controls a cell 10. The battery control system 1 supplies electric power provided from the cell 10 to an inverter 430 via a relay box 410. The inverter 430 drives and controls a motor 440. A hybrid controller 420 is an upper controller that controls the overall system including the battery control system 1.

The battery control system 1 includes a cell controller (CC) 100 and a battery controller (BC) 200. The cell controller 100 is connected with a cell group that includes one or more of the cell 10. The cell controller 100 measures states of each cell 100 belonging to the cell group. If there are multiple of cell groups, the cell controller 100 is provided for each of the cell groups. The battery controller 200 acquires a state of the cell 10 from each of the cell controllers 100. A wireless communication described in FIG. 2 connects between the cell controller 100 and the battery controller 200.

Figure 2:
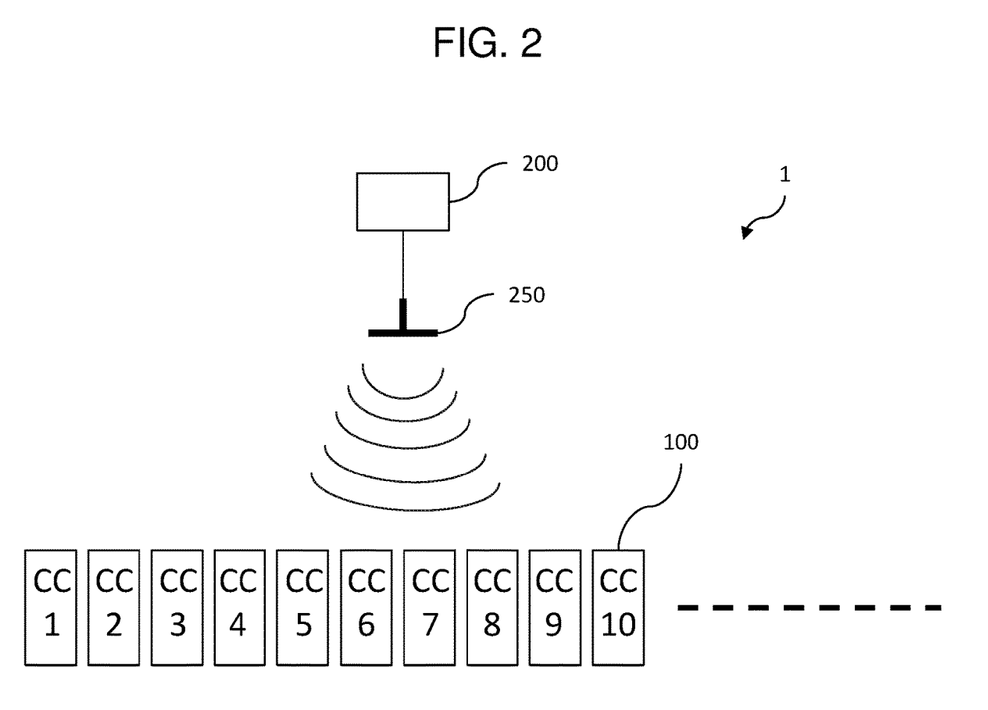
FIG. 2 is a diagram illustrating a connection between a cell controller 100 and a battery controller 200.

FIG. 2 is a diagram illustrating a connection between the cell controller 100 and the battery controller 200. The battery controller 200 includes one or more antenna 250. The battery controller 200 communicates with the cell controller 100 via the antenna 250. If there are multiple of cell controllers 100, the cell controllers 100 may be divided into two or more groups, and the antenna 250 may be provided for each of the group, for example.

Figure 3:
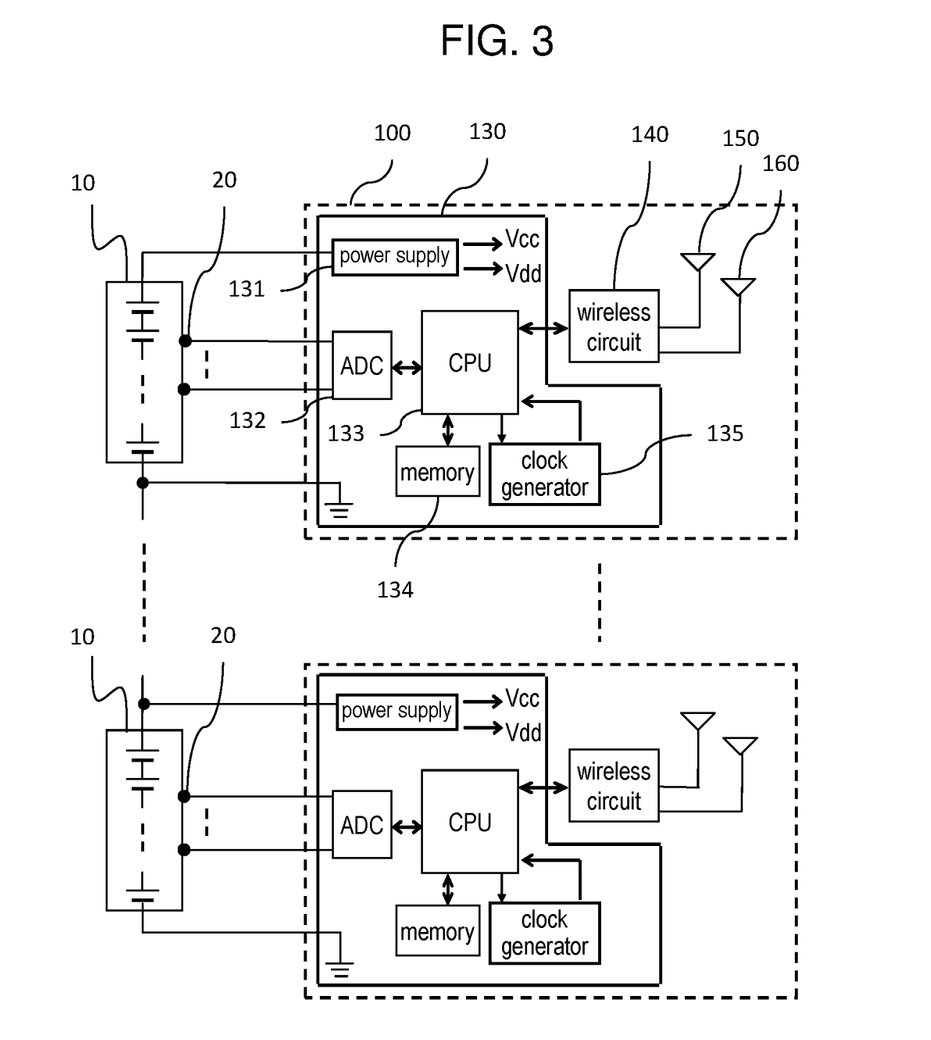
FIG. 3 is a configuration diagram of the cell controller 100.

FIG. 3 is a configuration diagram of the cell controller 100. The cell controller 100 acquires a state of the cell 10 (voltage between both ends, input and output currents, temperature, etc.) from the cell 10 or from a sensor 20 attached near the cell 10. The cell controller 100 includes a processor 130, a wireless circuit 140, a send antenna 150, and a receive antenna 160. The wireless circuit 140 wirelessly communicates with the battery controller 200 via the send antenna 150 and the receive antenna 160.

The processor 130 includes a power supply 131, an analog/digital converter (ADC) 132, a CPU (Central Processing Unit) 133, a memory 134, and a clock generator 135. The power supply 131 receives electric power from the cell 10, and outputs operational voltages Vcc and Vdd using the received power. The ADC 132 converts measurement signals outputted from the sensor 20 into digital data. The CPU 133 acquires an output from the ADC 132, and wirelessly sends the output via the wireless circuit 140. The memory 134 is a storage device that stores data such as the unique ID of the cell controller 100. The clock generator 135 is capable of outputting clock signals switching between fast clock around several MHz and low clock around tens of kHz.

The CPU 133 performs processes according to the communication data received by the wireless circuit 140, for example: (a) turning ON/OFF each circuit included in the cell controller 100; (b) switching the clock frequency outputted from the clock generator 135; (c) read/write process onto the memory 134; (d) executing instructions from the battery controller 200.

Figure 4:
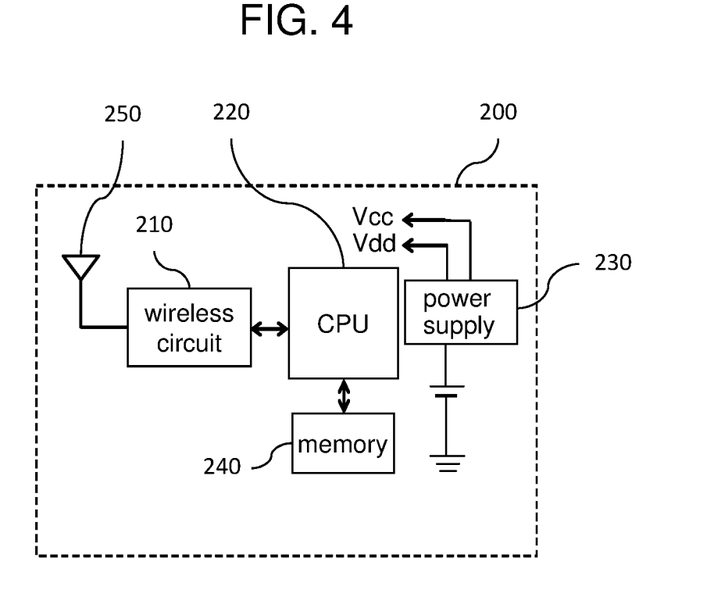
FIG. 4 is a configuration diagram of the battery controller 200.

FIG. 4 is a configuration diagram of the battery controller 200. The battery controller 200 includes a wireless circuit 210, a CPU 220, a power supply 230, a memory 240, and an antenna 250.

The wireless circuit 210 wirelessly communicates with the cell controller 100 via the antenna 250. The power supply 230 receives electric power supply from a battery included in the battery controller 200 or from an external battery, and outputs operational voltages Vcc and Vdd using the received power. The memory 240 is a storage device that stores data such as the unique ID of the battery controller 200. The CPU 220 wirelessly communicates via the wireless circuit 210, thereby sending instructions to the cell controller 100 and receiving measured results regarding states of the cell 10 from the cell controller 100.

Figure 5:
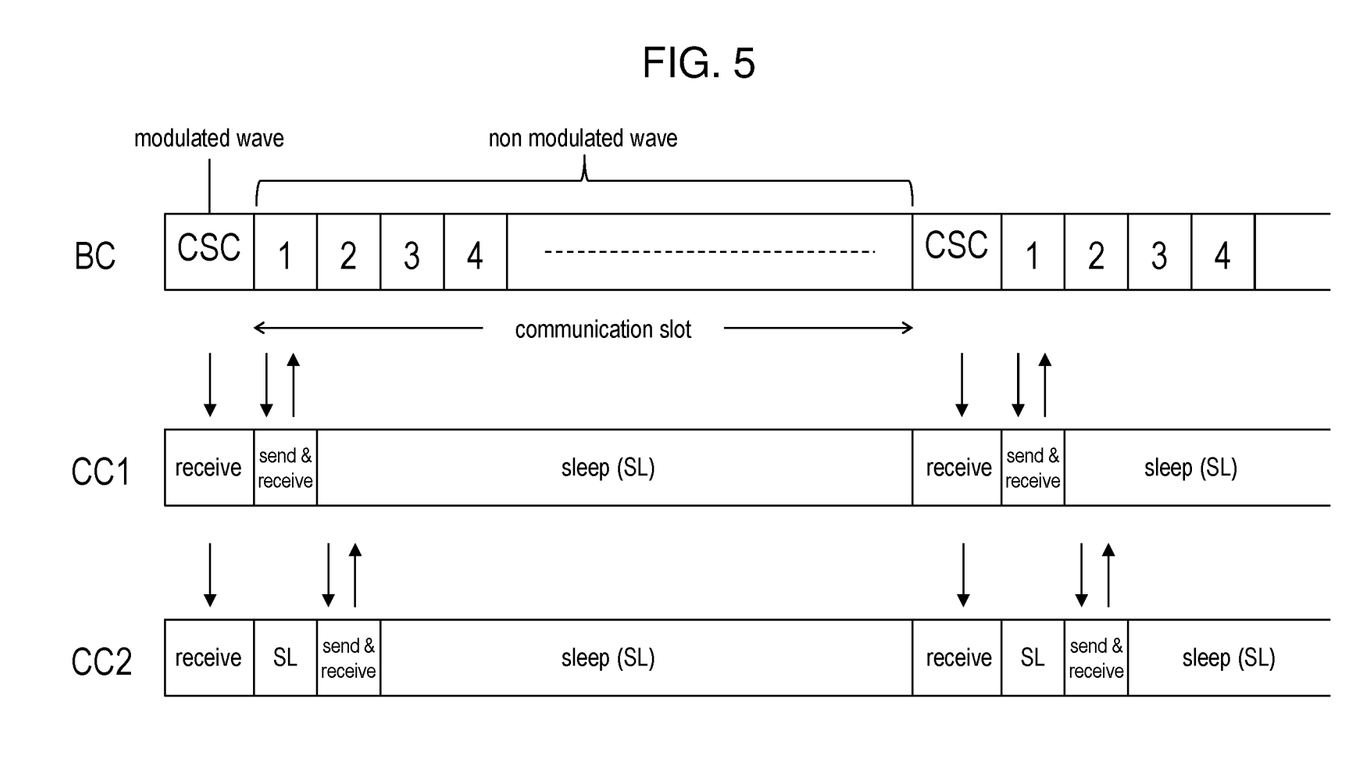
FIG. 5 is a time chart illustrating a communication sequence between the battery controller 200 and the cell controller 100.

FIG. 5 is a time chart illustrating a communication sequence between the battery controller 200 and the cell controller 100. This example shows that two cell controllers 100 (CC1 and CC2 in FIG. 5) wirelessly communicate with the battery controller 200.

The battery controller 200 sends, to each of the cell controllers 100, a command CSC requesting to respond states of the cells 10. The command CSC is sent by a modulated wave in which a predetermined modulation is applied. Each of the cell controllers 100 receives the command CSC at approximately same time. The battery controller 200, after completing the transmission of command CSC, continuously sends non-modulated waves until sending the next command CSC.

When receiving the command CSC, each of the cell controllers 100 responds, to the battery controller 200, a response signal to the command CSC within a communication slot that is assigned to the cell controller 100 itself in advance. During periods other than receiving the command CSC and sending the response signal, each of the cell controllers 100 moves to an operational mode (sleep mode) in which electric power consumption is smaller than that of sending and receiving operations.

Figure 6:
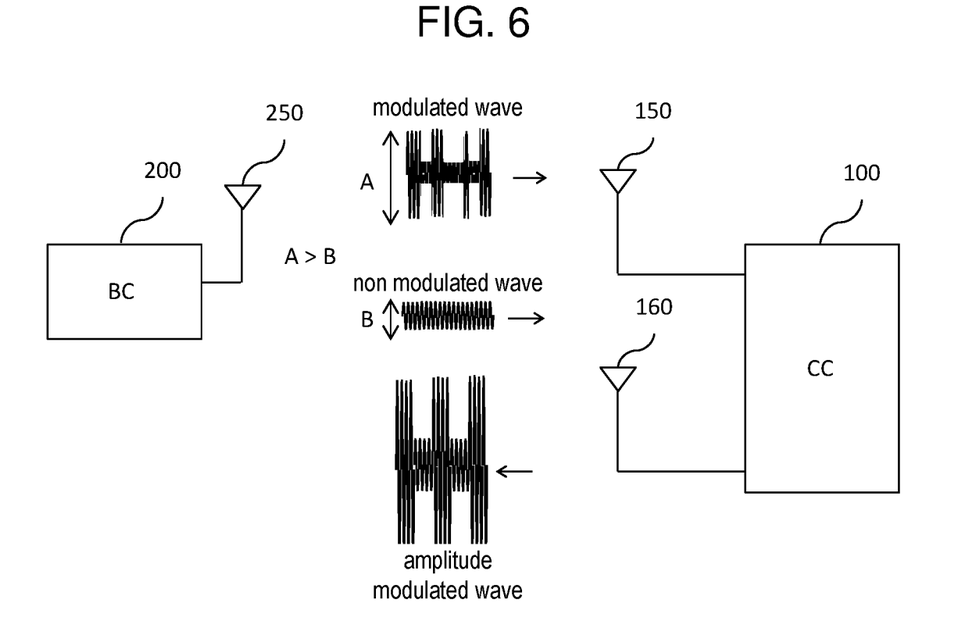
FIG. 6 is a conceptual diagram illustrating a signal level that is transmitted between the battery controller 200 and the cell controller 100.

FIG. 6 is a conceptual diagram illustrating a signal level that is transmitted between the battery controller 200 and the cell controller 100. The command CSC is sent using a modulated wave in which arbitrary modulation scheme is applied. The non-modulated wave sent after the command CSC is sent at a power level smaller than that of the command CSC (e.g. smaller by tens of dB). Since the command CSC is sent at sufficiently high signal level, it is possible to keep a sufficient communication range at least when sending the command CSC.

The signal level of the non-modulated wave is decreased in order to avoid the non-modulated wave sneaking into the receiving side of the battery controller 200, which saturates the linearity of input/output of receive amplifiers in the battery controller 200. An amplifier typically has a characteristic in which the linearity between input and output is collapsed (saturated) when the input level reaches above some level. Therefore, it is desirable for the amplifier to operate within an operational range in which some extent of extra signal level is secured. If the non-modulated wave sneaks into the receive amplifier, the input into the receive amplifier may increase above expected, and thus the input/output characteristic may be saturated. Thus the battery controller 200 decreases the signal level of the non-modulated wave below that of the command CSC.

After amplifying the non-modulated wave sent from the battery controller 200, the cell controller 100 applies, to the amplified non-modulated wave, amplitude modulation that represents the content of response. The response signal is generated by the amplitude modulation. When using two-level amplitude modulation, it is desirable that the larger side of amplitude-modulated wave is larger than the received level when the cell controller 100 receives the non-modulated wave. In addition, considering the easiness of detecting waveforms, it is desirable that the smaller side of amplitude-modulated wave is as small as possible compared to the larger side. It is further desirable if the smaller side is smaller than the received level of the non-modulated wave.

Figure 7:
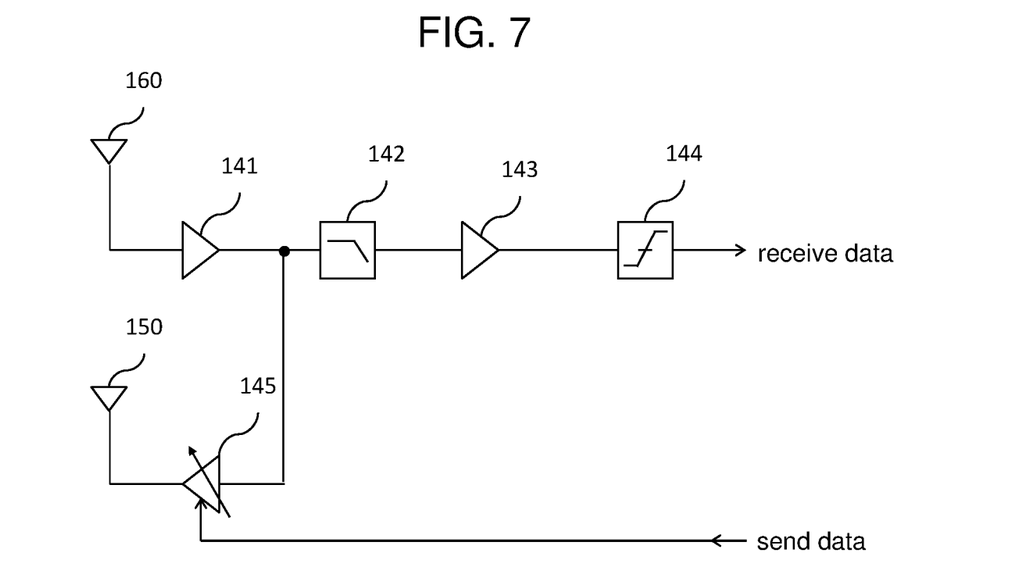
FIG. 7 is a circuit configuration diagram of a wireless circuit 140.

FIG. 7 is a circuit configuration diagram of the wireless circuit 140. The receive antenna 160 receives radio waves sent from the battery controller 200. The receive amplifier 141 amplifies the signal received by the receive antenna 160. The filter 142 extracts desired components from the signal amplified by the receive amplifier 141. The data amplifier 143 amplifies the component extracted by the filter 142. The data slicer 144 converts the signal amplified by the data amplifier 143 into bit values "1" or "0", and outputs the converted values to the processor 130. Via the processes above, the receiving operation is completed.

When the cell controller 100 sends the response signal, the receive antenna 160 firstly receives the non-modulated wave sent from the battery controller 200, and the receive amplifier 141 amplifies the non-modulated wave. The gain variable amplifier 145 receives the amplified non-modulated wave. The processor 130 changes the amplifying gain of the gain variable amplifier 145 in accordance with the bit vales representing the response content. For example, the amplifying gain for the signal of bit value "1" is greater than that of bit value "0". Accordingly, it is possible to generate a response signal using the amplitude modulation scheme. Specific gain values may be configured so that the amplitude-modulated wave includes appropriate amplitudes as mentioned above. The send antenna 150 sends the response signal.

Embodiment 1: Summary

In the battery control system 1 according to the embodiment 1, the battery controller 200 sends the non-modulated wave at a power level smaller than that of the command CSC. Accordingly, it is possible to keep the communication range of the command CSC, as well as to suppress phenomenon where the non-modulated wave sneaks into the receiving side of the battery controller 200 to saturate the receive amplifier of the battery controller 200. This configuration is specifically beneficial, when the distance between the battery controller 200 and the cell controller 100 is long and thus it is necessary to amplify the radio wave received by the battery controller 200.

In the battery control system 1 according to the embodiment 1, the cell controller 100 modulates the non-modulated wave sent from the battery controller 200, thereby generating the response signal. Thus it is not necessary for the cell controller 100 to generate carrier waves, which suppresses power consumption.

The battery control system 1 according to the embodiment 1 amplifies the non-modulated wave using the gain variable amplifier 145. It is suitable when it is desired to increase the distance between the battery controller 200 and the cell controller 100.

Embodiment 2

The embodiment 1 describes that the cell controller 100 amplifies the non-modulated wave sent from the battery controller 200, thereby generating the response signal. An embodiment 2 of the present invention is same as the embodiment 1 in that: the response signal is generated by applying amplitude modulation onto the non-modulated wave sent from the battery controller 200. However, the embodiment 2 describes a configuration example where the response signal is generated using a reflected wave of the non-modulated wave instead of amplifying the non-modulated wave itself. Other configurations are same as in the embodiment 1. Thus hereinafter the difference from the embodiment 1 will be mainly described.

Figure 8:
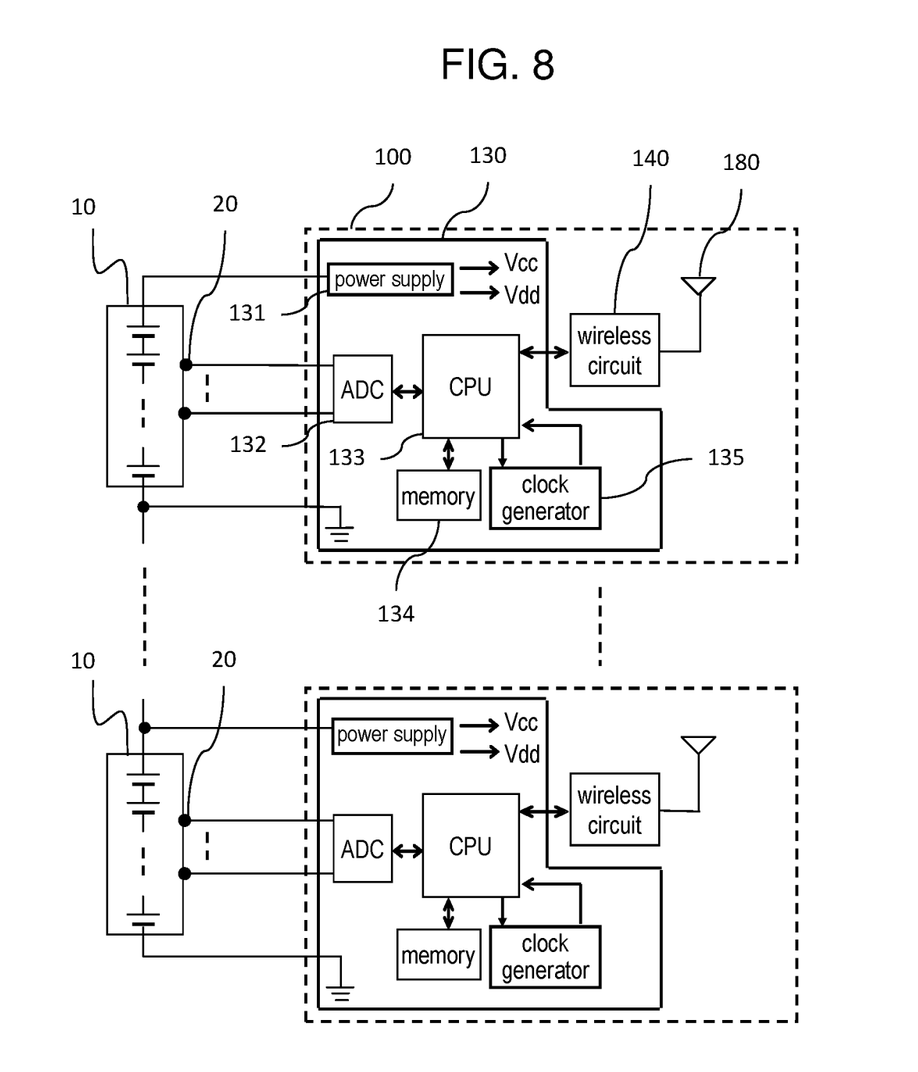
FIG. 8 is a circuit configuration diagram of the cell controller 100 in an embodiment 2.

FIG. 8 is a circuit configuration diagram of the cell controller 100 in the embodiment 2. In the embodiment 2, the cell controller 100 includes a send and receive antenna 180 instead of the receive antenna 160 and of the send antenna 150. The configuration of the wireless circuit 140 will be described with reference to FIG. 10 below.

Figure 9:
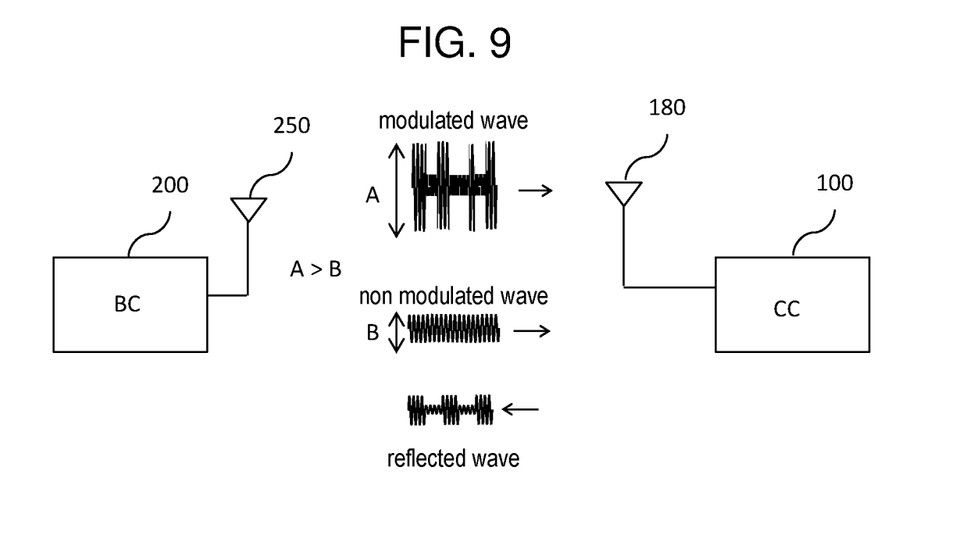
FIG. 9 is a conceptual diagram illustrating a signal level that is transmitted between the battery controller 200 and the cell controller 100 in the embodiment 2.

FIG. 9 is a conceptual diagram illustrating a signal level that is transmitted between the battery controller 200 and the cell controller 100 in the embodiment 2. The cell controller 100 applies amplitude modulation onto a reflected wave of the non-modulated wave sent from the battery controller 200, thereby generating the response signal. Thus the signal level of the response signal is smaller than that of the embodiment 1.

Figure 10:
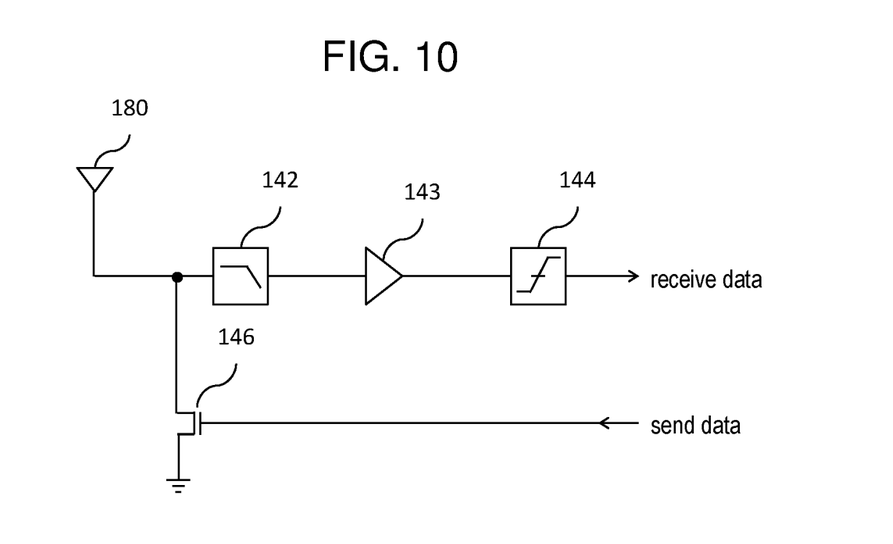
FIG. 10 is a circuit configuration diagram of a wireless circuit 140 in the embodiment 2.

FIG. 10 is a circuit configuration diagram of the wireless circuit 140 in the embodiment 2. In the embodiment 2, in contrast to the embodiment 1, the wireless circuit 140 does not include the receive amplifier 141 and the gain variable amplifier 145. The wireless circuit 140 includes a modulation circuit 146 instead of those two amplifiers. The send and receive antenna 180 receives radio wave sent from the battery controller 200. The filter 142 extracts desired components from the signal received by the send and receive antenna 180. The subsequent receiving operations are same as those in the embodiment 1.

When the cell controller 100 sends the response signal, the send and receive antenna 180 firstly receive the non-modulated wave sent from the battery controller 200. The processor 130 instructs the modulation circuit 146 to change the impedance of the send and receive antenna 180 in accordance with the bit values representing the response content. The modulation circuit 146 changes the impedance of the send and receive antenna 180 in accordance with the instruction. Accordingly, it is possible to apply amplitude modulation onto the reflected wave of the non-modulated wave. The send and receive antenna 180 sends the response signal.

Embodiment 2: Summary

In the battery control system 1 according to the embodiment 2, the cell controller 100 is configured as a passive-type wireless terminal that generates the response signal using the reflected wave of the non-modulated wave. It is suitable when the communication range between the battery controller 200 and the cell controller 100 is relatively short, and when it is desired to suppress power consumption of the cell controller 100.

<Modification of the Present Invention>

The present invention is not limited to the foregoing embodiments but includes various modification examples. For example, the foregoing embodiments have been described in detail to facilitate understanding of the present invention, and the present invention is not limited to one including all of the components described herein. Also, some components of one embodiment can be substituted with components of another embodiment, and components of another embodiment can be added to components of one embodiment. Further, some components of each embodiment can be added, deleted, and substituted with other components.

In the embodiment 1, when the receive level received by the receive antenna 160 is sufficiently large, the output level from the receive amplifier 141 is also sufficiently large. In this case, the gain of the gain variable amplifier 145 may be reduced. On the other hand, if the receive level is not sufficiently large, the gain of the gain variable amplifier 145 may be increased, thereby compensating the response signal level.

In the embodiments above, the battery controller 200 and the cell controller 100 may wirelessly communicate in the frequency band of 2.4 GHz. This frequency band is widely used at communication range of several meters. Thus it may be utilized even if the allocation of the battery controller 200 and the cell controller 100 slightly changes. As long as acceptable under constraints such as communication environment, other frequency bands may be utilized.

REFERENCE SIGNS LIST

1: battery control system
10: cell
100: cell controller
130: processor
140: wireless circuit
150: send antenna
160: receive antenna
180: send and receive antenna
200: battery controller
210: wireless circuit
220: CPU
230: power supply
240: memory
250: antenna

The invention claimed is:

1. A battery control system comprising:
a cell controller that acquires a state of a battery; and
a battery controller that controls the cell controller by wirelessly communicating with the cell controller, wherein
after sending a response request to the cell controller using a modulated signal, the battery controller sends, to the cell controller, a non-modulated signal that has a power level smaller than that of the modulated signal, and
upon receiving the response request, the cell controller applies, onto the non-modulated signal, amplitude modulation representing a response content to the battery controller, thereby generating a response signal to the battery controller and responding the response signal to the battery controller.

2. The battery control system according to claim 1,
wherein the cell controller further comprising:
a receive antenna that receives the non-modulated signal;
an amplifier that amplifies the non-modulated signal received by the receive antenna; and
a send antenna that sends the response signal,
wherein the amplifier switches a gain for amplifying the non-modulated signal between a first gain and a second gain, thereby applying the amplitude modulation onto the non-modulated signal.

3. The battery control system according to claim 2,
wherein the amplifier uses, as the first gain, a gain that outputs a power level larger than a receive power level of the non-modulated signal, and
wherein the amplifier uses, as the second gain, a gain that outputs a power level smaller than a receive power level of the non-modulated signal.

4. The battery control system according to claim 3,
wherein the larger a power level of a signal received by the receive antenna is, the smaller the amplifier modifies the first gain.

5. The battery control system according to claim 4,
wherein the cell controller further comprises:
an antenna that receives the non-modulated signal and that sends the response signal; and
a modulation circuit that applies the amplitude modulation onto a reflected wave of the non-modulated signal received by the antenna.

6. The battery control system according to claim 1,
wherein the battery control system comprises a plurality of the cell controller, and
wherein each of the cell controllers uses a time slot that is previously assigned so as not to overlap with that of other one of the cell controller, thereby sending the response signal to the battery controller.

7. The battery control system according to claim 6,
wherein during a period from when receiving the response request to when receiving next one of the response request, the cell controller moves to an operational mode at a time other than the assigned time slot, wherein electric power consumption in the operational mode is smaller than that of when sending the response signal.

8. The battery control system according to claim 1,
wherein the cell controller acquires a state of the battery from a sensor that measures a state of the battery, and
wherein the cell controller sends, to the battery controller, at least one of a voltage between both ends of the battery, an input and output currents of the battery, or a temperature of the battery as the response content according to the state of the battery acquired from the sensor.

9. The battery control system according to claim 1,
wherein the cell controller receives electric power supply from the battery.

10. The battery control system according to claim 1,
wherein the cell controller and the battery controller wirelessly communicate with each other using a frequency band of 2.4 GHz.

* * * * *